Nov. 21, 1933. A. A. LAWSON 1,935,850
PIVOTAL CONNECTION
Filed Jan. 24, 1933
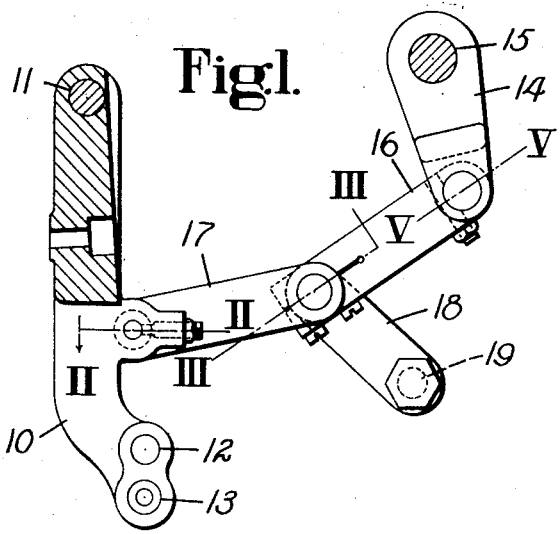
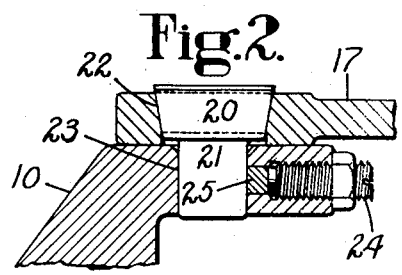
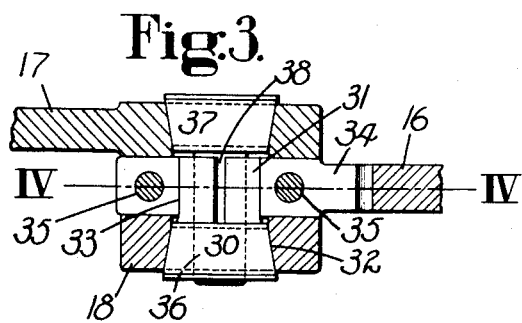
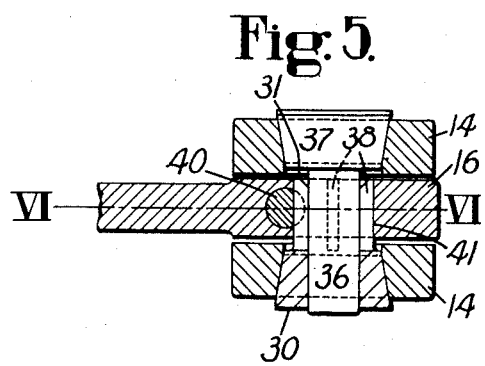
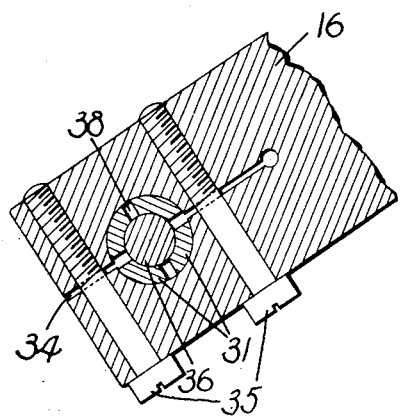
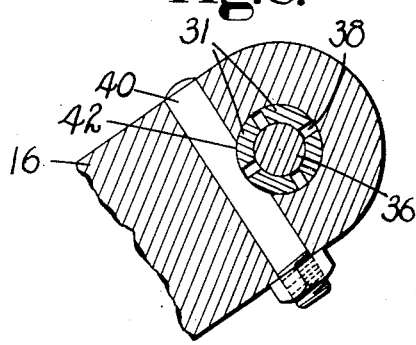

Patented Nov. 21, 1933

1,935,850

UNITED STATES PATENT OFFICE 1,935,850

PIVOTAL CONNECTION

Axel A. Lawson, Beverly, Mass., assignor to United Shoe Machinery Corporation, Paterson, N. J., a corporation of New Jersey Application January 24, 1933. Serial No. 653,284

6 Claims. (Cl. 287—100)

This invention relates to devices for forming pivotal joints or connections between machine elements and more especially to devices of the type in which provision is made for relatively adjusting the joint-forming parts to take up lost motion.

In many automatic machines having trains of reciprocatory parts pivotally connected one to another lost motion, however slight, may result in faulty operation, particularly if it affects parts operated suddenly or at high speed, or parts that require precision with regard to one or both of their limits of movement. Even if parts forming pivotal connections are so accurately machined and fitted as to eliminate looseness at first, they may develop looseness as a result of wear, particularly when they are operated at high speeds or under heavy stresses. Although various expedients have been proposed to deal with such problems, many are unsatisfactory either because the vibration to which they are subjected in operation causes them to develop looseness soon after they have been adjusted, or because it is virtually impossible to adjust them to have the desired effect without making them so tight as to cause some other adverse condition.

In view of the conditions above set forth, and in accordance with an object of the present invention, the improvements herein illustrated provide pivotal joints in various forms embodying novel features of construction common to all whereby lost motion may be readily eliminated from the connected parts by light pressure of the fingers and whereby the parts thus adjusted may be tightly and permanently secured in their adjusted relation without developing any force that would affect the adjustment so obtained.

In accordance with a feature of the invention embodied in the illustrated construction a pivotal joint may comprise a member having a socket, two axially adjustable pivot-studs having telescopically related stems the outer one of which is split and arranged in the socket, means arranged to secure the outer stem to the socket-member with clamping pressure by which that stem is contracted to clamp the inner stem, and two members pivotally connected to the socket-member by the studs respectively. A practical advantage of this combination of elements is that one securing device is utilized to do double duty, that is, to secure the two pivot studs in rigid relation to each other, and to secure them both rigidly to the socket-member. Another advantage is that no matter how much force is applied to set up tightness of the parts thus rigidly related, this force does not effect the pressure with which the heads of the studs bear against the connected members.

Preferably, the heads of the studs and the holes formed to receive them are frusto-conical to provide for taking up looseness in the directions of kinetic energy, although the frusto-conical formations may not be necessary if the only duty of the heads of the studs is to eliminate looseness in the direction of the axis of the studs.

In many situations one joint-forming member lies between two rigidly related cheeks of a forked member such as a lever or a link. Here also, the present invention provides for taking up looseness in the direction of the axis of the studs, to the end that the thickness of the intermediate member and the space between the cheeks of the forked member need not be co-ordinated to prevent such looseness. When the latter condition exists the heads of the telescopically related pivot studs are effective to eliminate not only end-shake of the studs but also corresponding shake of the forked member and the intermediate joint-forming member. Consequently, even though the intermediate member may not quite fill the space between the cheeks of a fork, this feature of the invention furnishes a corrective whereby tolerances or discrepancies in the joint-forming elements may be readily and economically counteracted by light pressure of the fingers against the outer ends of the studs when assembling and adjusting the parts.

Referring to the drawing,

Fig. 1 represents a train of mechanism the parts of which are provided with pivotal connections embodying various modifications of the invention;

Fig. 2 is a sectional view, on a larger scale, of the connection intersected by line II—II of Fig. 1;

Fig. 3 is a sectional view of the pivotal connection intersected by line III—III of Fig. 1;

Fig. 4 is a sectional view in the plane indicated by line IV—IV of Fig. 3;

Fig. 5 is a sectional view of the pivotal connection intersected by the line V—V of Fig. 1; and Fig. 6 is a sectional view in the plane indicated by line VI—VI of Fig. 5.

The train of mechanism represented in Fig. 1 is a typical example of work-feeding mechanism applicable to automatic fastener-inserting machines of the type illustrated and described in United States Letters Patent No. 683,488, granted October 1, 1901 on application of M. H. Pearson. It is to be understood, however, that the present invention is not limited to machines of any particular type nor to mechanisms for any particular purpose. Nevertheless, for purposes of comparison with the patented construction, attention is directed to Figs. 13 and 15 of the patent above mentioned.

Referring to Fig. 1 of the present application, the element 10 is an arm or tool-carrier arranged to swing from side to side about a pivot member 11 to impart steps of feeding movement to an article of work in which a series of eyelets are to be inserted, the arm being provided with a punch 12 and with an eyelet-inserting device 13. The motion for swinging the arm 10 is derived originally from a cam (not shown) by which oscillatory motions of constant amplitude are imparted to a forked arm 14 by a rock-shaft 15. The to-and-fro motions of the arm 14 are communicated to the arm 10 by two links 16 and 17 arranged in series, the pivotal joint by which these two joints are connected being guided by a constraining link 18 to travel in an arc for which a pivot stud 19 provides an axis. This pivot stud 19 may be shifted from one location to another for the purpose of regulating the amplitude of the work-feeding strokes imparted to the arm 10, notwithstanding the fact that the amplitude of the strokes of the arm 14 is constant. Since this type of work-feeding mechanism having this provision for regulation is well-known and not particularly related to the present invention, no further discussion of its operation will be necessary.

To eliminate lost motion in the parts connecting the arm 14 and the arm 10, the present invention provides improved pivotal connections, one of which, as shown in Fig. 2, is embodied in a relatively simple form since it requires only one pivot stud to connect two members. The pivot stud for this joint comprises a frusto-conical head 20 and a stem 21 projecting from the smaller end of the head. The link 17 is provided with a frusto-conical hole 22 conforming to the head 20, while the arm 10 is provided with a socket 23 conforming to the stem 21. When the link 17 and the arm 10 are arranged in lapped relation, as shown, and connected by the stud, the stem 21 may be rigidly secured to the arm by tightening a set-screw 24 with which the arm is provided. Preferably, a pill or plug 25 of soft metal, such as lead, copper or brass, is interposed between the screw 24 and the stem 21 to apply the clamping pressure of the screw to the stem and at the same time to avoid indenting the stem. When the clamping pressure of the screw 24 is relaxed all lost motion between the link 17 and the arm 10 may be eliminated by pressing the head 20 lightly with a thumb or finger toward the arm 10, the confronting surfaces of the link and the arm being thereby placed in contact with each other and the head 20 being seated in the hole 22. Since the clamping of the stem 21 by the screw 24 is free from all stress lengthwise of the axis of the stud the clamping pressure may be developed to any desired degree without affecting the tightness with which the link 17 and the 10 are maintained in cooperative relation.

The pivotal joint illustrated in Figs. 3 and 4 includes three lapped members of which the link 17 is one, the link 18 is another, and the link 16 is the third. The link 16 is interposed between confronting portions of the links 17 and 18, and is connected to them by two cooperative pivot studs adapted to eliminate all looseness in the joint thus formed. The stud for connecting the links 16 and 18 comprises a frusto-conical head 30 and a stem 31, the link 18 being provided with a frusto-conical hole 32 conforming to the head 30, and the link 16 being provided with a socket 33 occupied by and conforming to the stem 31. In a construction of this type, provision for clamping the stem 33 may be made by sawing a kerf 34 in the link 16 to divide the latter in a plane intersecting the socket 33. The link 16 is thus provided with two cooperative clamping portions that may be drawn toward each other by screws 35 arranged to contract the socket.

The stud comprising the head 30 and the stem 31 is bored axially to receive the stem 36 of a cooperative stud which also is provided with a frusto-conical head 37. The link 17 is provided with a frusto-conical hole conforming to the head 37. While the split socket 33 and the screws 35 are effective to secure the stem 33 to the link 16 they may be utilized also to secure the stem 36 to the stem 31, without any additional means for the latter purpose. To this end, the outer stem 31 is divided into segments by kerfs 38, the segments being thereby rendered capable of being contracted against the stem 36 incidentally to contracting the socket 33 against the outer surfaces of the segments. Since the two studs are telescopically related and are individually adjustable lengthwise of their common axis, all looseness between the three links 16, 17 and 18 may be eliminated by pressing the heads 30 and 37 toward each other with a thumb and a finger incidentally to assembling these three links in the first instance, or to taking up lost motion that may have developed in consequence of long usage. The thumb-and-finger pressure applied to the heads 30 and 37 not only places the confronting surfaces of the links 17 and 18 in contact with opposite faces of the intermediate link 16 but also places the frusto-conical heads in contact with the frusto-conical bearing surfaces provided for their reception. When the clamping screws 35 are set up tightly, the two telescopically related studs and the intermediate link 16 become rigidly related to each other.

Another modification of the invention is represented in Figs. 5 and 6 in which one end of the link 16 lies between two confronting cheeks of the forked arm 14. In a construction such as this, the two cheeks of the arm 14 are rigidly related to each other and may not be moved one toward the other when adjusting the cooperative, telescopically related studs to eliminate lost motion. The studs illustrated in Figs. 5 and 6 embody the same details of construction as those represented in Figs. 3 and 4, and for this reason reference numerals are applied to them as in Figs. 3 and 4. Nevertheless, Figs. 5 and 6 include means of another type for securing the studs to each other and to the link 16. A clamping pin 40 extends transversely through the link 16 in which a socket for its reception is arranged to intersect one side of the socket 41. The clamping pin 40 is cylindrical except that it is cut away on one side to provide an operating surface 42 (Fig. 6) arranged to clamp the stem 31 with a wedging effect. One end of the pin 40 projects beyond the link 16 and is provided with a screw-thread and a nut 43 by which it may be drawn lengthwise to apply clamping pressure against the periphery of the outer stem 31. Thus, the clamping pin 40 is effective not only to secure the outer stem to the link 16 but also to contract the outer stem and thereby clamp the inner stem.

The three types of clamping means illustrated in Figs. 2, 3 and 5 may be used alternatively, although accessibility in a given organization may influence a choice. However, a condition common to each of them is that the clamping force is free from all stress lengthwise of the axis of the stud to which it is applied. With regard to the conditions appertaining to a pivotal joint in which a socket member is arranged between two rigidly related members, the invention furnishes a corrective whereby tolerances and discrepancies in machining the parts may be readily and economically counteracted in the assembling and adjusting of the joint-forming elements. This has particular reference to the width of the gap between two rigidly related confronting members such as the cheeks of a forked arm and the thickness of the intermediate member arranged in the gap. For example, the thickness of the intermediate member need not be quite as great as the width of the gap provided for its reception, moderate clearances being represented in Fig. 5. Nevertheless, since the heads of the studs cooperate with the rigidly related spaced members to prevent end-shake of the studs and since the intermediate socket member is rigidly related to the studs, the construction not only provides for elimination of lost motion transversely of the axis of the stud but also eliminates looseness lengthwise of that axis. Thus, the intermediate socket member is prevented from slapping the confronting faces of the members between which it is arranged.

Having thus described my invention, what I claim as new and desire to secure by Letters Patent of the United States is:

1. A pivotal joint comprising a member having a socket, two axially adjustable pivot-studs having telescopically related stems the outer one of which is split and arranged in said socket, means arranged to secure said outer stem to said member with clamping pressure by which the outer stem is contracted to clamp the inner stem, and two members pivotally connected to the first said member by said studs respectively.

2. A pivotal joint comprising two individual members having confronting portions spaced apart in which coaxial holes are formed to provide bearing surfaces, two cooperative and relatively adjustable pivot-studs arranged in said holes respectively and having telescopically related stems the outer one of which is split, an intermediate member arranged between said confronting portions and having a socket occupied by and conforming to said outer stem, said studs also having heads by which said confronting portions may be maintained against said intermediate member, and means arranged to secure said outer stem to said intermediate member with clamping pressure by which the outer stem is contracted to clamp the inner stem.

3. A pivotal joint comprising two rigidly related members spaced apart in confronting relation and having coaxial holes to provide pivotal bearing surfaces, two cooperative and relatively adjustable pivot-studs arranged in said holes respectively and having telescopically related stems the outer one of which is split, an intermediate member arranged between said rigidly related members and having a socket occupied by and conforming to said outer stem, said studs also having heads to prevent relative endshake of the studs and said rigidly related members, and means arranged to secure said outer stem to said intermediate member with clamping pressure by which the outer stem is contracted to clamp the inner stem.

4. A pivotal joint comprising two rigidly related members spaced apart in confronting relation and having coaxial frusto-conical holes the smaller ends of which are toward each other, two cooperative and relatively adjustable pivot-studs having frusto-conical heads arranged in and conforming respectively to said holes, said studs also having stems fitted one into the other in telescopic relation, an intermediate member arranged between said confronting members and having a socket occupied by and conforming to the outer one of said stems, and means constructed and arranged to bind said stems to each other and to said intermediate member with clamping effect free from stress lengthwise of the axis of said studs.

5. A pivotal joint comprising two confronting members spaced apart and having coaxial frusto-conical holes the smaller ends of which are toward each other, two cooperative and relatively adjustable pivot-studs having frusto-conical heads arranged in and conforming respectively to said holes, said studs also having stems fitted one into the other in telescopic relation, an intermediate member arranged between said confronting members and having a split socket occupied by and conforming to the outer one of said stems, and means arranged to contract said socket and said outer stem which is also split, and thereby to clamp the inner stem.

6. A pivotal joint comprising two confronting members spaced apart and having coaxial frusto-conical holes the smaller ends of which are toward each other, two cooperative and relatively adjustable pivot-studs having frusto-conical heads arranged in and conforming respectively to said holes, said studs also having stems fitted one into the other in telescopic relation, an intermediate member arranged between said confronting members and having a socket occupied by and conforming to the outer one of said stems, and a wedge movable in said intermediate member in contact with the periphery of the outer stem, the latter being split to clamp the inner stem when contracted by said wedge.

AXEL A. LAWSON.